US006931370B1

(12) United States Patent
McDowell

(10) Patent No.: US 6,931,370 B1
(45) Date of Patent: Aug. 16, 2005

(54) SYSTEM AND METHOD FOR PROVIDING INTERACTIVE AUDIO IN A MULTI-CHANNEL AUDIO ENVIRONMENT

(75) Inventor: Samuel Keith McDowell, Thousand Oaks, CA (US)

(73) Assignee: Digital Theater Systems, Inc., Agoura Hills, CA (US)

( * ) Notice: Subject to any disclaimer, the term of this patent is extended or adjusted under 35 U.S.C. 154(b) by 0 days.

(21) Appl. No.: 09/432,917

(22) Filed: Nov. 2, 1999

(51) Int. Cl.[7] ............................................ G01L 19/00

(52) U.S. Cl. .................................... 704/200.1; 704/500

(58) Field of Search ................................ 704/500, 209, 704/261, 258, 503, 229, 200.1, 230, 201, 704/278; 341/110, 117; 375/243, 241, 146, 375/147, 316

(56) References Cited

U.S. PATENT DOCUMENTS

| | | | | |
|---|---|---|---|---|
| 4,546,212 | A * | 10/1985 | Crowder, Sr. | 370/488 |
| 5,448,568 | A | 9/1995 | Delpuch et al. | |
| 5,734,678 | A * | 3/1998 | Paneth et al. | 375/240 |
| 5,864,816 | A * | 1/1999 | Everett | 704/500 |
| 5,909,664 | A * | 6/1999 | Davis et al. | 704/200.1 |
| 6,278,387 | B1 * | 8/2001 | Rayskiy | 341/61 |
| 6,314,391 | B1 * | 11/2001 | Tsutsui et al. | 704/214 |

FOREIGN PATENT DOCUMENTS

| | | |
|---|---|---|
| EP | 0675492 A1 | 10/1995 |
| EP | 0949763 A2 | 10/1999 |

OTHER PUBLICATIONS

ISO/IEC 11172-3, International Standard—Information Technology—Coding of moving pictures and associated audio for digital storage media at up to about 1,5 Mbit/s—Part 3: Audio.*

* cited by examiner

*Primary Examiner*—David L. Ometz
*Assistant Examiner*—Michael N. Opsasnick
(74) *Attorney, Agent, or Firm*—Blake A. Welcher; William L. Johnson; Eric A. Gifford

(57) ABSTRACT

DTS Interactive provides low cost fully interactive immersive digital surround sound environment suitable for 3D gaming and other high fidelity audio applications, which can be configured to maintain compatibility with the existing infrastructure of Digital Surround Sound decoders. The component audio is stored and mixed in a compressed and simplified format that reduces memory requirements and processor utilization and increases the number of components that can be mixed without degrading audio quality. Techniques are also provided for "looping" compressed audio, which is an important and standard feature in gaming applications that manipulate PCM audio. In addition, decoder sync is ensured by transmitting frames of "silence" whenever mixed audio is not present either due to processing latency or the gaming application.

38 Claims, 11 Drawing Sheets

SYSTEM AND METHOD FOR PROVIDING INTERACTIVE AUDIO IN A MULTI-CHANNEL AUDIO ENVIRONMENT

FIELD OF THE INVENTION

This invention relates to fully interactive audio systems and more specifically to a system and method of rendering real-time multi-channel interactive digital audio to create a rich immersive surround sound environment suitable for 3D gaming, virtual reality and other interactive audio applications.

BACKGROUND OF THE INVENTION

Recent developments in audio technology have focused on creating real-time interactive positioning of sounds anywhere in the three-dimensional space surrounding a listener (the "sound field"). True interactive audio provides not only for the ability to create the sound on-demand but the ability to position that sound precisely in the sound field. Support for such technologies can be found in a variety of products but most frequently in software for video games to create a natural, immersive, and interactive audio environments. Applications extend beyond gaming into the entertainment world in the form of audiovisual products such as DVD, and also into video-conferencing, simulation systems and other interactive environments.

Advances in audio technology have proceeded in the direction of making the audio environment "real" to a listener. Surround sound developments followed, first in the analog domain with the development of HRTFs, Dolby Surround and later in the digital domain with AC-3, MPEG, and DTS to immerse a listener in the surround sound environment.

In order to portray a realistic synthetic environment, virtual sound systems use binaural technology and psychoacoustic cues to create the illusion of surround audio without the need for multiple speakers. The majority of these virtualized 3D audio technologies are based on the concept of HRTFs (Head-Related Transfer Functions). The original digitized sound is convolved in real-time with the left- and right-ear HRTFs corresponding to the desired spatial location, right- and left-ear binaural signals are produced, which when heard seem to come from the desired location. To position the sound, the HRTFs are changed to those for the desired new location and the process repeated. A listener can experience nearly free-field listening through headphones if the audio signals are filtered with that listener's own HRTFs. However, this is often impractical and experimenters have searched for a set of general HRTFs that have good performance for a wide range of listeners. This has been difficult to accomplish with a specific obstacle being front-back confusion, which describes the sensation that sounds either in front of or behind the head are coming from the same direction. Despite its drawbacks, HRTF methods have been successfully applied to both PCM audio and with much lessened computational load to compressed MPEG audio. Although virtual surround technologies based on HRTFs provide significant benefits in situations where full home theater set-ups are not practical these current solutions do not provide any means for interactive positioning of specific sounds.

The Dolby Surround system is another method to implement positional audio. Dolby Surround is a matrix process that enables a stereo (two-channel) medium to carry four-channel audio. The system takes four-channel audio and generates two channels of Dolby Surround encoded material identified as left total (Lt) and right total (Rt). The encoded material is decoded by a Dolby Pro-Logic decoder producing a four-channel output; a left channel, a right channel, a center channel and a mono surround channel. The center channel is designed to anchor voices at the screen. The left and right channels are intended for music and some sound effects, with the surround channel primarily dedicated to the sound effects. The surround sound tracks are pre-encoded in Dolby Surround format, and thus they are best suited for movies, and are not particularly useful in interactive applications such as video games. PCM audio can be overlaid on the Dolby Surround sound audio to provide a less controllable interactive audio experience. Unfortunately, mixing PCM with Dolby Surround Sound is content dependant and overlaying PCM audio on the Dolby Surround sound audio tends to confuse the Dolby Prologic decoder, which can create undesirable surround artifacts and crosstalk.

To improve channel separation digital surround sound technologies such as Dolby Digital and DTS provide six discrete channels of digital sound in a left, center and right front speakers along with separate left surround and right surround rear speakers and a subwoofer. Digital surround is a pre-recorded technology and thus best suited for movies and home A/V systems where the decoding latency can be accommodated and in its present form it is not particularly useful for interactive applications such as video games. However, since Dolby Digital and DTS provide high fidelity positional audio, have a large installed base of home theater decoders, definitions for a multi-channel 5.1 speaker format and product available for market, they present a highly desirable multi-channel environment for PCs and in particular console based gaming systems if they could be made fully interactive. However, the PC architecture has generally been unable to deliver multi-channel digital PCM audio to home entertainment systems. This is primarily due to the fact that the standard PC digital output is through a stereo based S/PDIF digital out put connector.

Cambridge SoundWorks offers a hybrid digital surround/PCM approach in the form of the DeskTop Theater 5.1 DTT2500. This product features a built-in Dolby Digital decoder that combines pre-encoded Dolby Digital 5.1 background material with interactive four-channel digital PCM audio. This system requires two separate connectors; one to deliver the Dolby Digital and one to deliver the 4-channel digital audio. Although a step forward, Desktop Theater is not compatible with the existing installed base of Dolby Digital decoders and requires sound cards supporting multiple channels of PCM output. The sounds are reproduced from the speakers located at known locations, but the goal in an interactive 3D sound field is to create a believable environment in which sounds appear to originate from any chosen direction about the listener. The richness of the DeskTop Theater's interactive audio is further limited by the computation requirements needed to process the PCM data. Sideways localization, which is a critical component of a positional audio environment is computationally expensive to apply on time-domain data, as are the operations of filtering and equalization.

The gaming industry needs a low cost fully-interactive low latency immersive digital surround sound environment suitable for 3D gaming and other interactive audio applications that allows the gaming programmer to mix a large number of audio sources and to precisely position them in the sound field and which is compatible with the existing infrastructure of home theater Digital Surround Sound systems.

SUMMARY OF THE INVENTION

In view of the above problems, the present invention provides a low cost fully interactive immersive digital surround sound environment suitable for 3D gaming and other high fidelity audio applications, which can be configured to maintain compatibility with the existing infrastructure of Digital Surround Sound decoders.

This is accomplished by storing each audio component in a compressed format that sacrifices coding and storage efficiency in favor of computational simplicity, mixing the components in the subband domain rather than the time domain, recompressing and packing the multi-channel mixed audio into the compressed format and passing it to a downstream surround sound processor for decoding and distribution. As the multi-channel data is in a compressed format, it can be passed across a stereo based S/PDIF digital out put connector. Techniques are also provided for "looping" compressed audio, which is an important and standard feature in gaming applications that manipulate PCM audio. In addition, decoder sync is ensured by transmitting frames of "silence" whenever mixed audio is not present either due to processing latency or the gaming application.

More specifically, the components are preferably encoded into a subband representation, compressed and packed into a data frame in which only the scale factors and subband data change from frame-to-frame. This compressed format requires significantly less memory than standard PCM audio but more than that required by variable length code storage such as used in Dolby AC-3 or MPEG. More significantly this approach greatly simplifies the unpack/pack, mix and decompress/compress operations thereby reducing processor utilization. In addition, fixed length codes (FLCs) aid the random access navigation through an encoded bitstream. High levels of throughput can be achieved by using a single predefined bit allocation table to encode the source audio and the mixed output channels. In the currently preferred embodiment, the audio renderer is hardcoded for a fixed header and bit allocation table so that the audio renderer only need process the scale factors and subband data.

Mixing is achieved by partially decoding (decompressing) only the subband data from components that are considered audible and mixing them in the subband domain. The subband representation lends itself to a simplified psychoacoustic masking technique so that a large number of sources can be rendered without increasing processing complexity or reducing the quality of the mixed signal. In addition, since multi-channel signals are encoded into their compressed format prior to transmission, a rich high-fidelity unified surround sound signal can be delivered to the decoder over a single connection.

These and other features and advantages of the invention will be apparent to those skilled in the art from the following detailed description of preferred embodiments, taken together with the accompanying drawings, in which:

BRIEF DESCRIPTION OF THE DRAWINGS

FIGS. 3-1 & 3-2 (collectively FIG. 3) are a flowchart of the audio rendering layer shown in FIG. 2;

DETAILED DESCRIPTION OF THE INVENTION

DTS Interactive provides a low cost fully interactive immersive digital surround sound environment suitable for 3D gaming and other high fidelity audio applications. DTS Interactive stores the component audio in a compressed and packed format, mixes the source audio in the subband domain, recompresses and packs the multi-channel mixed audio into the compressed format and passes it to a downstream surround sound processor for decoding and distribution. As the multi-channel data is in a compressed format, it can be passed across a stereo based S/PDIF digital out put connector. DTS Interactive greatly increases the number of audio sources that can be rendered together in an immersive multi-channel environment without increasing the computational load or degrading the rendered audio. DTS Interactive simplifies equalization and phase positioning operations. In addition techniques are provided for "looping" compressed audio and decoder sync is ensured by transmitting frames of "silence" whenever source audio is not present where silence includes true silence or low level noise. DTS Interactive is designed to maintain backward compatibility with the existing infrastructure of DTS Surround Sound decoders. However, the described formatting and mixing techniques could be used to design a dedicated gaming console that would not be limited to maintaining source and/or destination compatibility with the existing decoder.

DTS Interactive

Figure 1A:
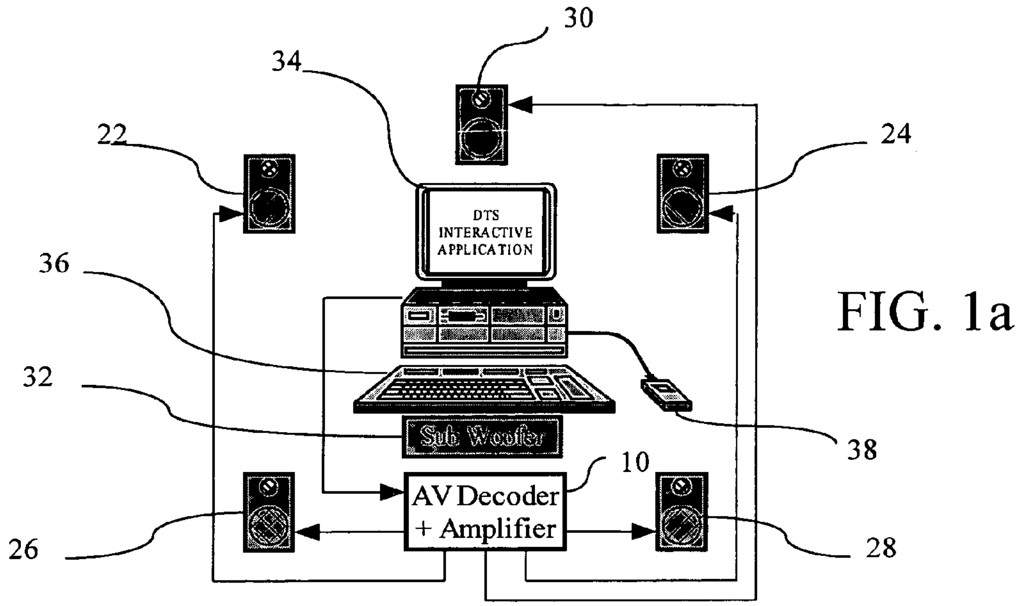
FIGS. 1*a* through 1*c* are block diagrams of different gaming configurations in accordance with the present invention.
Figure 1B:
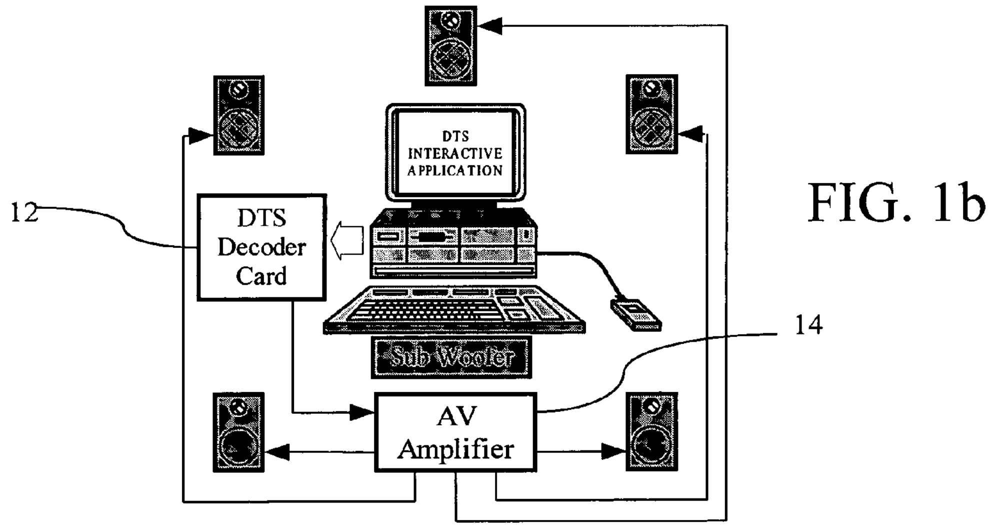
Figure 1C:
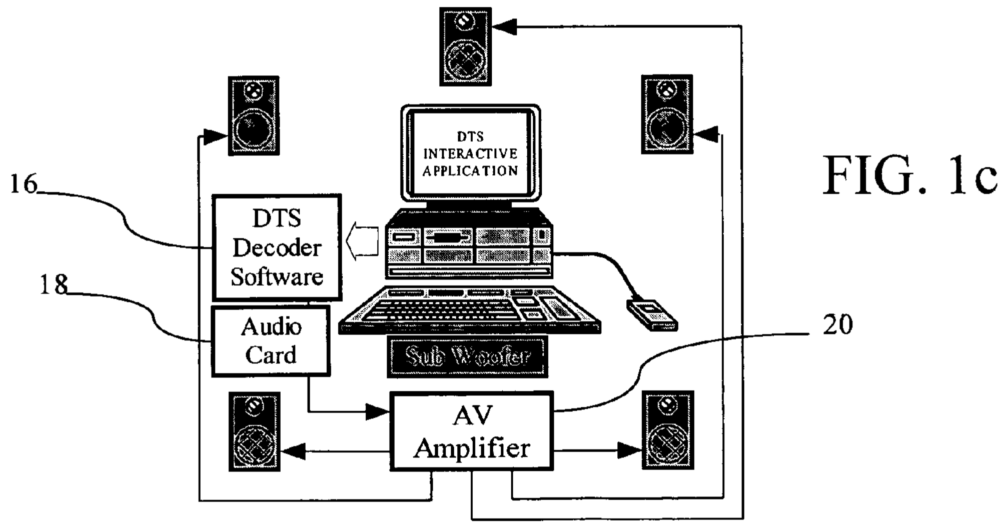

The DTS Interactive system is supported by multiple platforms, of which there are the DTS 5.1 multi-channel home theatre system 10, which includes a decoder and an AV amplifier, a sound card 12 equipped with hardware DTS decoder chipset with an AV amplifier 14, or a software implemented DTS decoder 16 with an audio card 18 and an AV amplifier 20, see FIGS. 1*a*, 1*b* and 1*c*. All those systems require a set of speakers named left 22, right 24, left surround 26, right surround 28, center 30 and sub-woofer 32, a multi-channel decoder and a multi-channel amplifier. The decoder provides digital S/PDIF or other input for supplying compressed audio data. The amplifier powers six discrete speakers. Video is rendered on a display or projection device 34, usually a TV or other monitor. A user interacts with the AV environment through a human interface device (HID) such as a keyboard 36, mouse 38, position sensor, trackball or joy stick.

Application Programming Interface (API)

Figure 2:
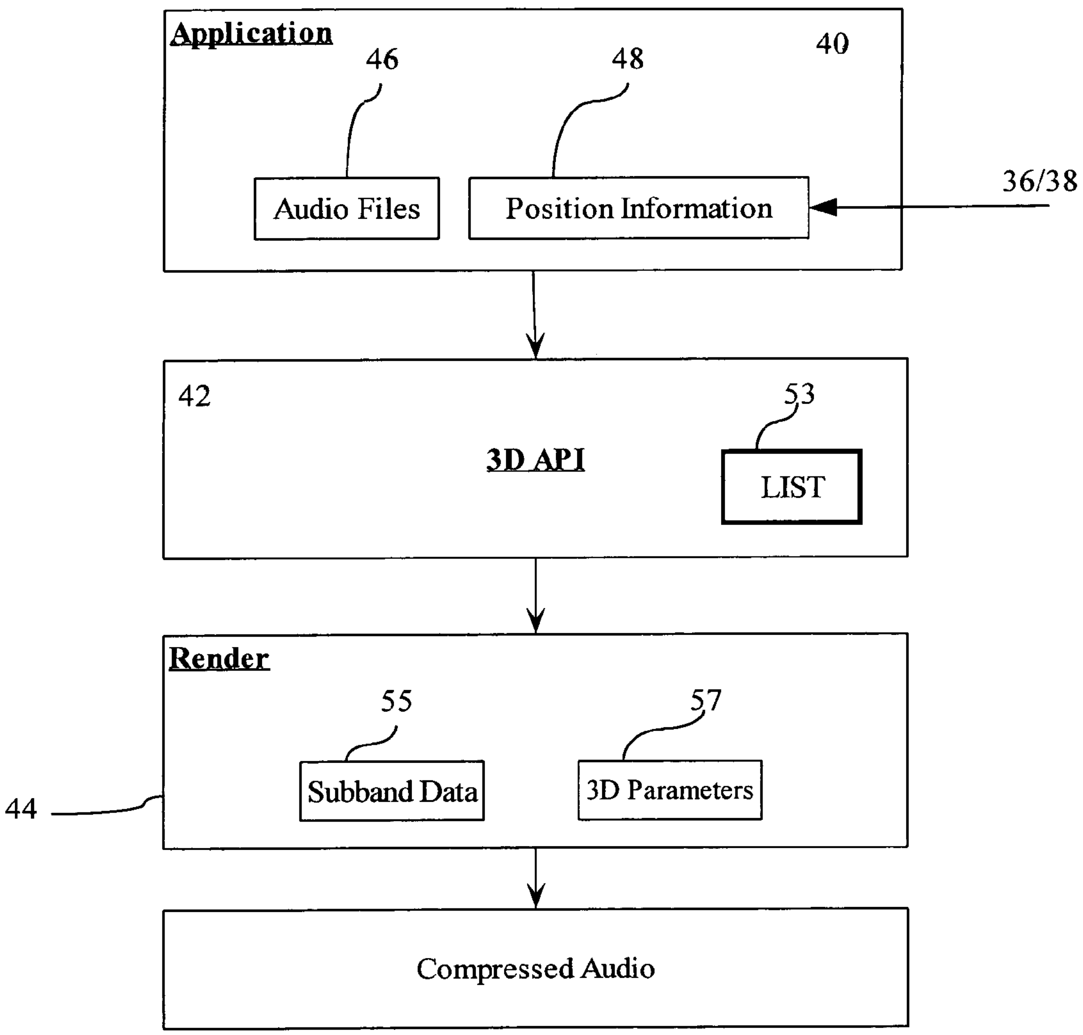
FIG. 2 is a block diagram of the application layer structure for a fully interactive surround sound environment.
Figures 1, 3:
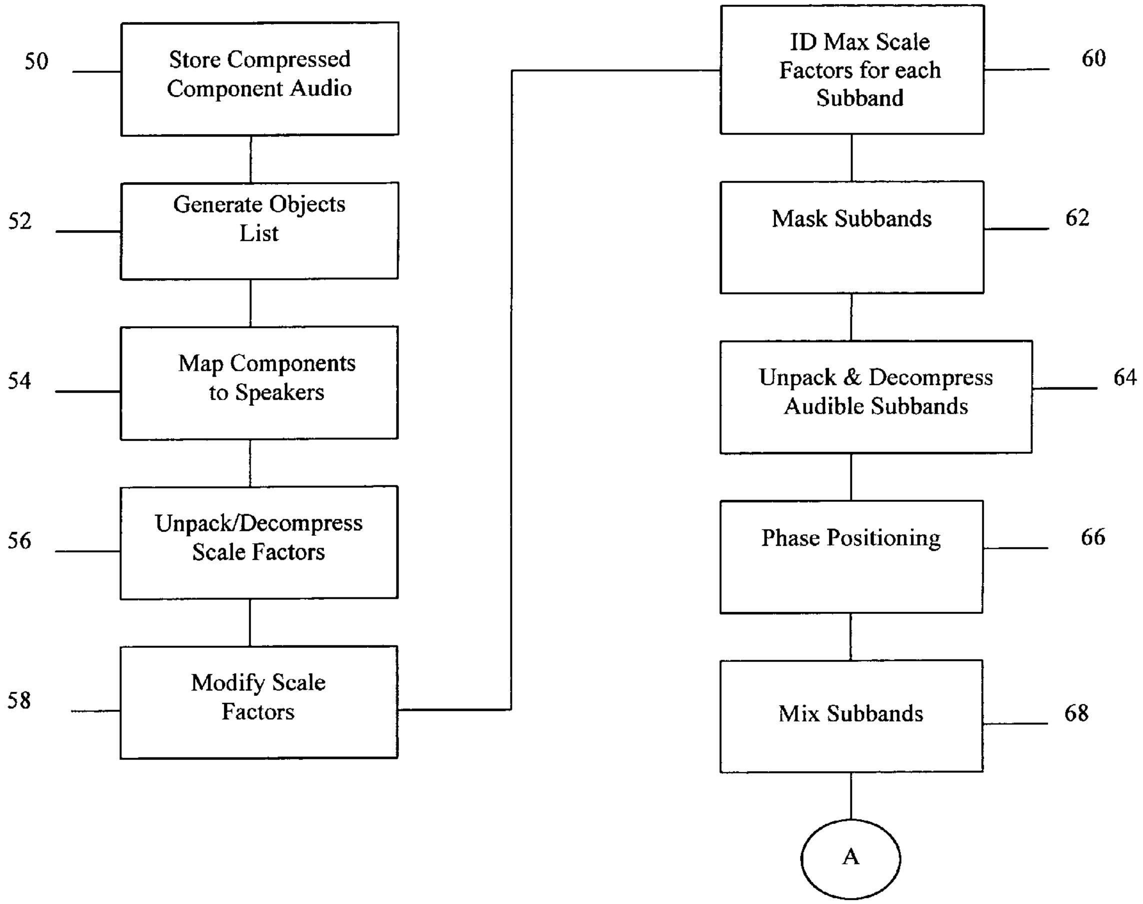
Figures 2, 3:
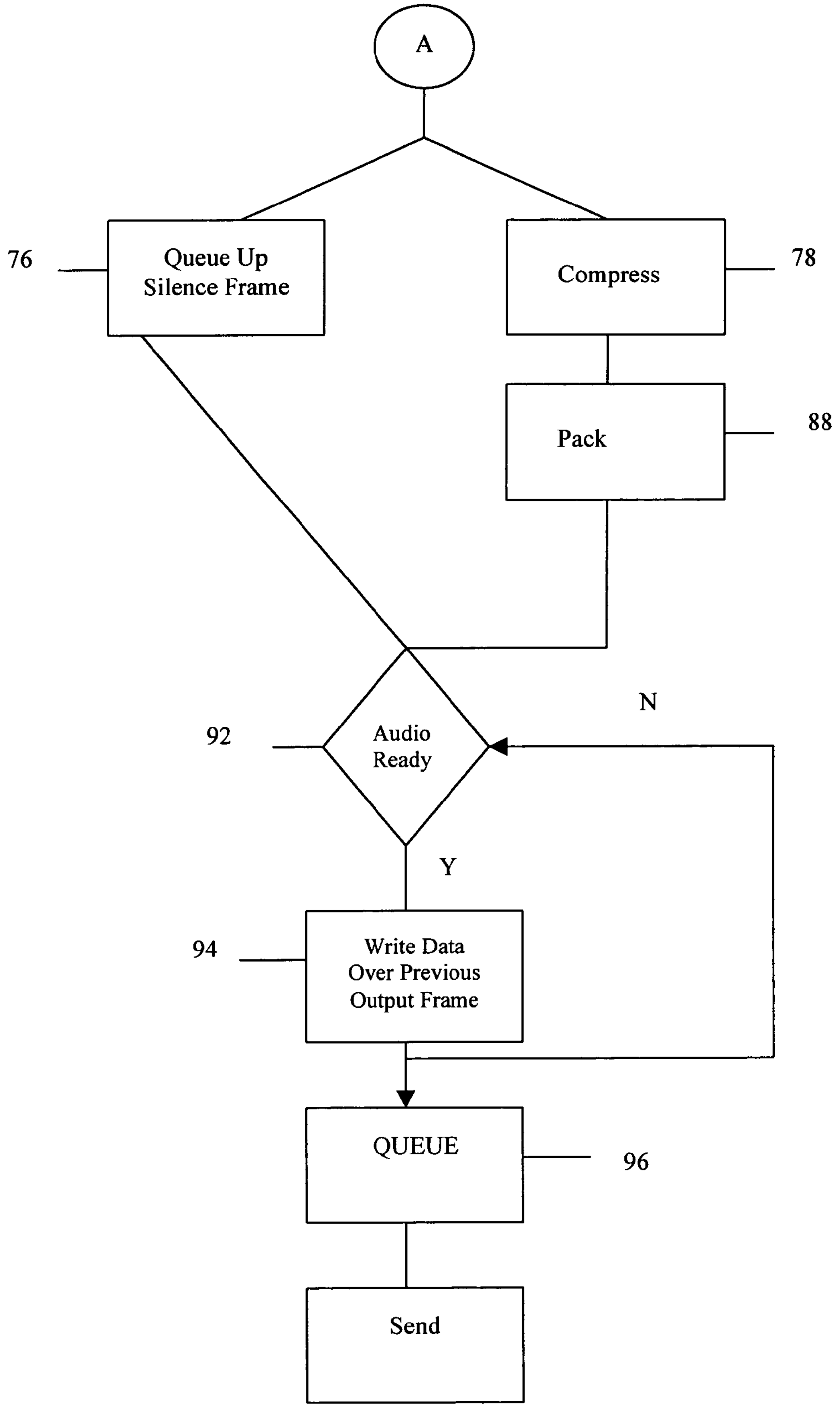

As shown in FIGS. 2 and 3, the DTS Interactive system consists of three layers: the application 40, the application programming interface (API) 42 and the audio renderer 44. The software application could be a game, or maybe a music playback/composition program, which takes component audio files 46 and assigns to each some default positional character 48. The application also accepts interactive data from the user via an HID 36/38.

For each game level, frequently used audio components are loaded into memory (step 50). Because each component is treated as an object the programmer is kept unaware of the sound format and rendering details, he need only be concerned with the absolute position to the listener and the effects processing that might be desired. The DTS Interactive format allows these components to be mono, stereo or multi-channel with or without low frequency effects (LFE). Since DTS Interactive stores the components in a compressed format (see FIG. 6) valuable system memory is saved that can otherwise be used for higher resolution video rendering, more colors, or more textures. The reduced file size resulting from the compressed format also permits rapid on demand loading from the storage media. The sound components are provisioned with parameters to detail the position, equalization, volume and necessary effects. These details will influence the outcome of the rendering process.

API layer 42 provides an interface for the programmer to create and control each sound effect and also provides isolation from the complicated real-time audio rendering process that deals with the mixing of the audio data. Object orientated classes create and control the sound generation. There are several class members at the programmers disposal, which are as follows: load, unload, play, pause, stop, looping, delay, volume, equalization, 3D position, maximum and minimum sound dimensions of the environment, memory allocation, memory locking and synchronization.

The API generates a record of all sound objects created and loaded into memory or accessed from media (step 52). This data is stored in an object list table. The object list does not contain the actual audio data but rather tracks information important to the generation of the sound such as information to indicate the position of the data pointer within the compressed audio stream, the position coordinates of the sound, the bearing and distance to the listener's location, the status of the sound generation and any special processing requirements for mixing the data. When the API is called to create a sound object, a reference pointer to the object is automatically entered into the object list. When an object is deleted, the corresponding pointer entry in the object list is set to null. If the object list is full then a simple age based caching system can choose to overwrite old instances. The object list forms the bridge between the asynchronous application, the synchronous mixer and compressed audio generator processes.

The classes inherited by each object permit start, stop, pause, load and unload functions to control the generation of the sound. These controls allow the play list manager to examine the object list and construct a play list 53 of only those sounds that are actively playing at that moment in time. The manager can decide to omit a sound from the play list if it is paused, stopped, has completed playing or has not been delayed sufficiently to commence playing. Each entry in the play list is a pointer to individual frames within a sound that must be examined and if necessary piecewise unpacked prior to mixing. Since frame sizes are constant, manipulation of the pointer permits playback positioning, looping and delay of the output sound. This pointer value indicates the current decoding position within the compressed audio stream.

The positional localization of sounds requires the assignment of sounds to individual rendering pipelines or execute buffers that in turn map directly onto the arrangement of the loudspeakers (step 54). This is the purpose of the mapping function. Position data for entries in the frame list are examined to determine which signal processing functions to apply, renew the bearings and direction of each sound to the listener, alter each sound depending on physical models for the environment, determine mixing coefficients and allocate audio streams to available and most appropriate speakers. All parameters and model data are combined to deduce modifications to the scale factors associated with each compressed audio frame entering a pipeline. If side localization is desired, data from the phase shift tables are indicated and indexed.

Audio Rendering

As shown in FIGS. 2 and 3, audio rendering layer 44 is responsible for mixing the desired subband data 55 according to the 3D parameters 57 set by the object classes. The mixing of multiple audio components requires the selective unpacking and decompression of each component, summing of correlated samples and the calculation of a new scale factor for each subband. All processes in the rendering layer must function in real-time to deliver a smooth and continuous flow of compressed audio data to the decoding system. A pipeline receives a listing of the sound objects in play and, from within each object, directions for the modification of the sound. Each pipeline is designed to manipulate the component audio according to the mixing coefficients and to mix an output stream for a single speaker channel. The output streams are packed and multiplexed into a unified output bitstream.

Figure 7:
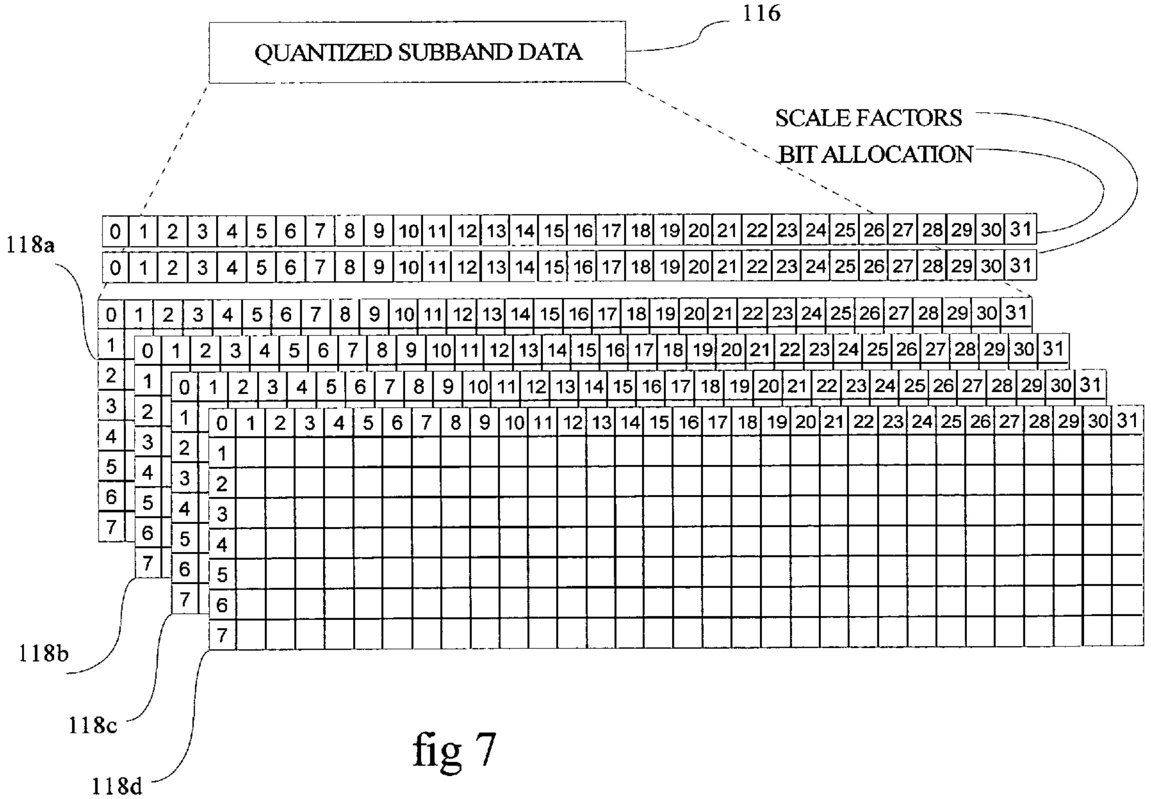
FIG. 7 is a diagram depicting the organization of the quantized subband data, scale factors and bit allocation in each frame.

More specifically, the rendering process commences by unpacking and decompressing each component's scale factors into memory on a frame-by-frame basis (step 56), or alternately multiple frames at a time (see FIG. 7). At this stage only the scale factor information for each subband is required to assess if that component, or portions of the component, will be audible in the rendered stream. Since fixed length coding is used, it is possible to unpack and decompress only that part of the frame that contains the scale factors thereby reducing processor utilization. For SIMD performance reasons each 7-bit scale factor value is stored as a byte in memory space, and aligned to a 32-byte address boundary to ensure that a cache line read will obtain all scale factors in one cache fill operation and not cause cache memory pollution. To further speed this operation, the scale factors may be stored as bytes in the source material and organized to occur in memory on 32 byte address boundaries.

The 3D parameters 57 provided by the 3D position, volume, mixing and equalization are combined to determine a modification array for each subband that is used to modify the extracted scale factors (step 58). Because each component is represented in the subband domain equalization is a trivial operation of adjusting the sub-band coefficients as desired via the scale factors.

In step 60, the maximum scale factors indexed for all elements in the pipeline are located and stored to an output array, which is suitably aligned in memory space. This information is used to decide the need to mix certain subband components.

Figure 8:
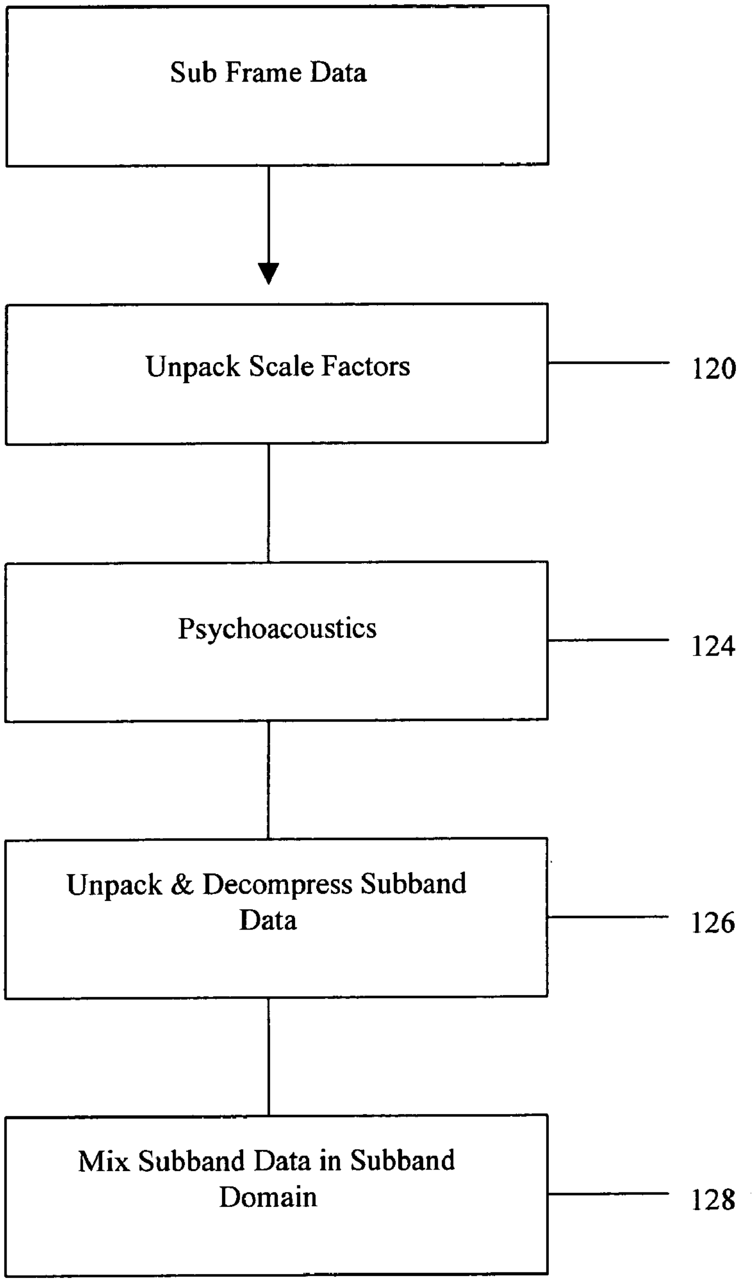
FIG. 8 is a block diagram of the subband domain mixing process.
Figure 9:
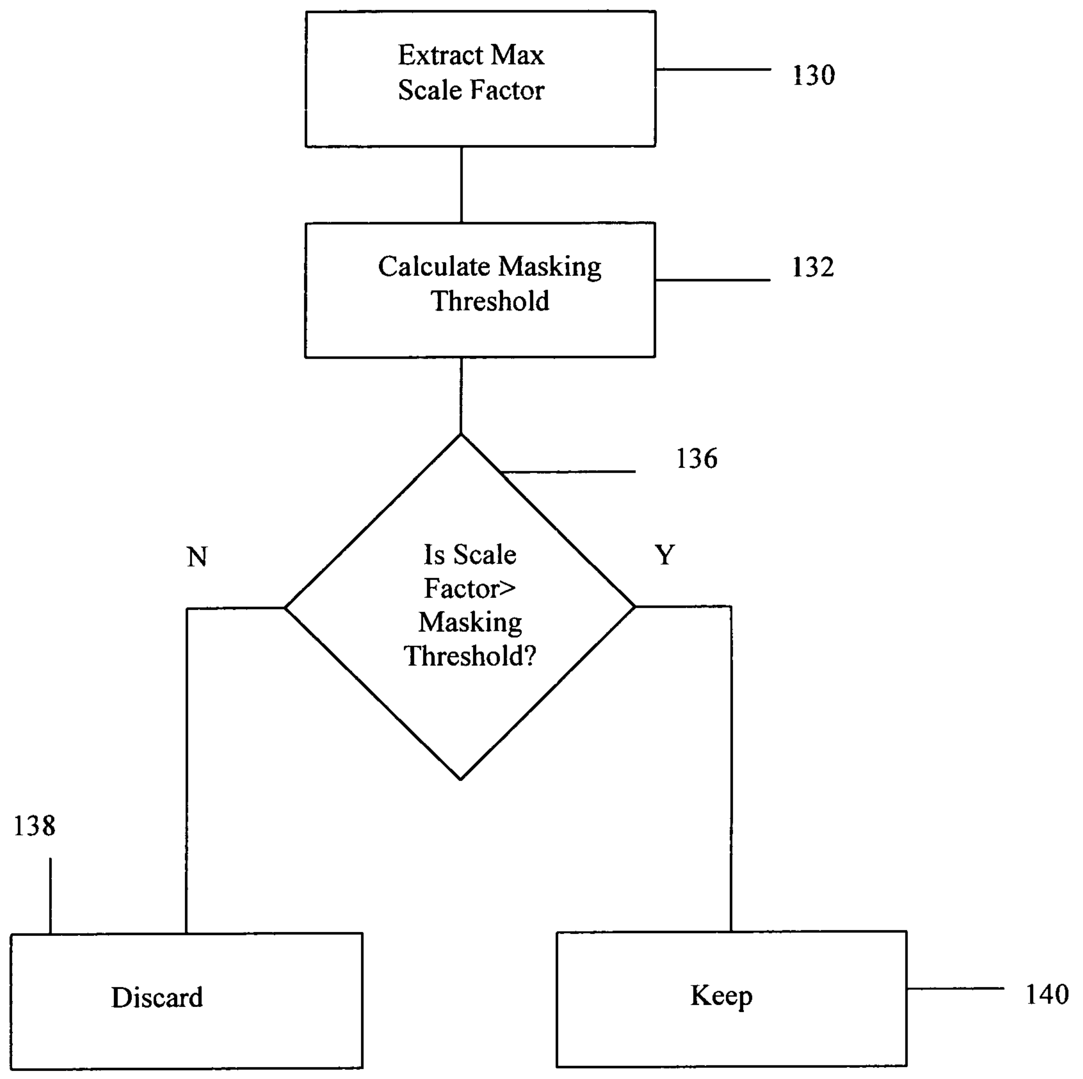
FIG. 9 is a diagram that illustrates the psychoacoustic masking effects.

At this point, step 62, masking comparisons are made with the other pipelined sound objects to remove the inaudible subbands from the speaker pipelines (see FIGS. 8 and 9 for details). The masking comparisons are preferably done for each subband independently to improve speed and are based upon the scale factors for the objects referenced by the list. A pipeline contains only that information which is audible from a single speaker. If an output scale factor is below the threshold of human hearing then the output scale factor may be set to zero and in doing so remove the need to mix the corresponding subband components. The advantage of DTS Interactive over manipulation of PCM time-domain audio is that the gaming programmer is allowed to use many more components and rely on the masking routine to extract and mix only the audible sounds at any given time without excess computations.

Figure 10A:
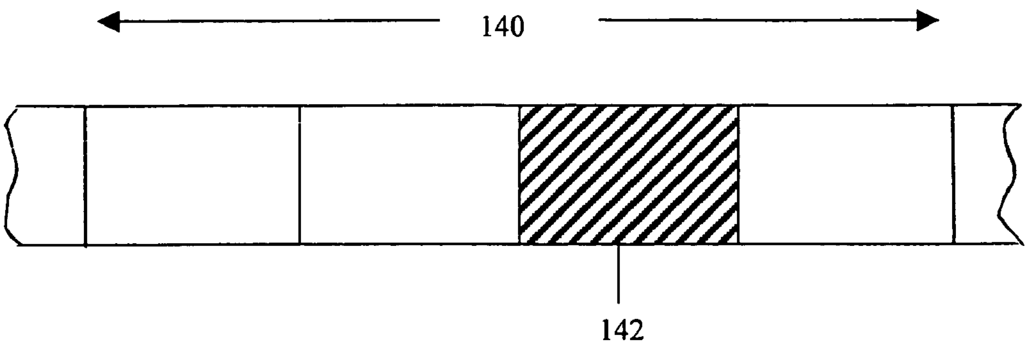
FIGS. 10*a* through 10*c* diagram the bit extraction process for packing and unpacking each frame.
Figure 10B:
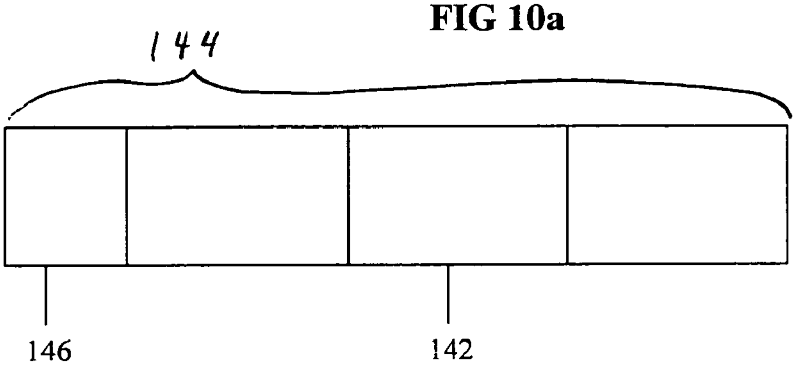
Figure 10C:
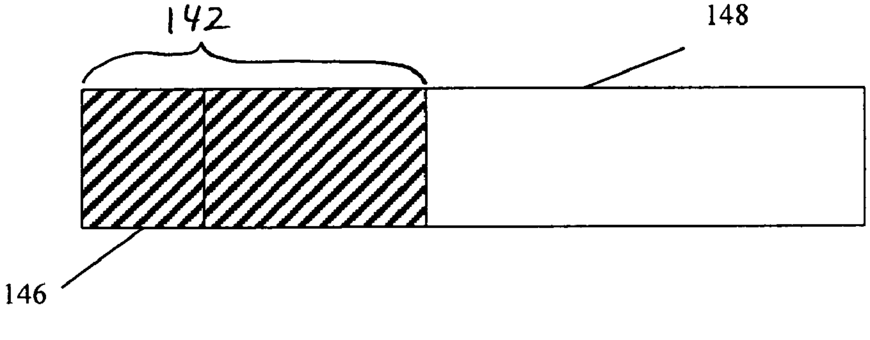

Once the desire subbands are identified, the audio frames are further unpacked and decompressed to extract only the audible subband data (step 64), which is stored as left shifted DWORD format in memory (see FIGS. 10*a*–10*c*). Throughout the description the DWORD is assumed without loss of generality to be 32 bits. In the gaming environment, the price paid in lost compression for using FLCs is more than compensated by the reduction in the number of computations required to unpack and decompress the subband data. This process is further simplified by using a single predefined bit allocation table for all of the components and channels. FLCs enable random positioning of the read position at any subband within the component.

In step 66, phase positioning filtering is applied to the subband data for bands 1 and 2. The filter has specific phase characteristics and need only be applied over the frequency range 200 Hz to 1200 Hz where the ear is most sensitive to positional cues. Since phase position calculations are only applied to first two bands of the 32 subbands the number of computations is approximately one-sixteenth the number required for an equivalent time-domain operation. The phase modification can be ignored if sideways localization is not a necessity or if the computational overhead is viewed excessive.

Figure 11:
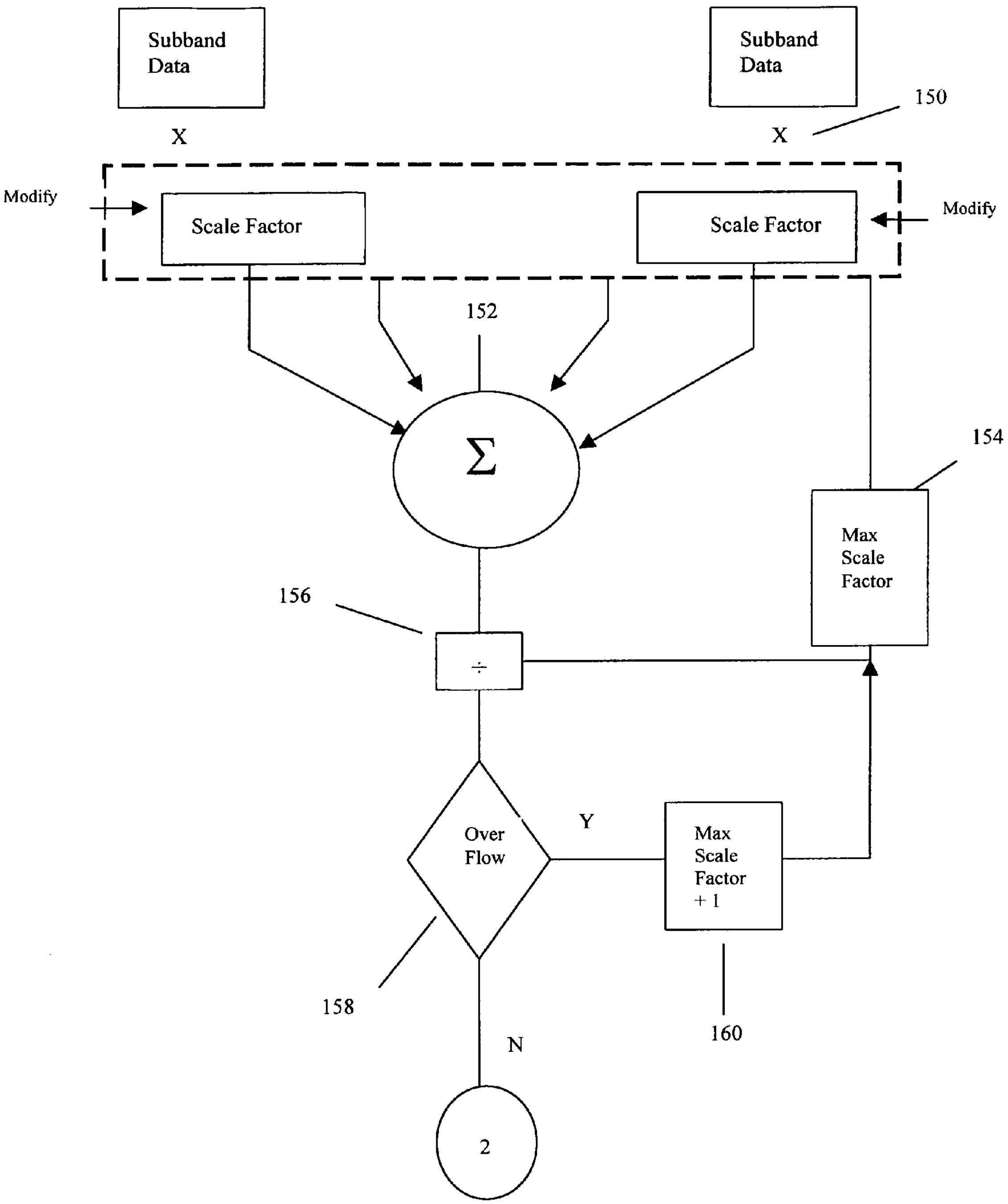
FIG. 11 is diagram that illustrates the mixing of the specified subband data.

In step 68, subband data is mixed by multiplying it by the corresponding modified scale factor data and summing it with the scaled subband products of the other eligible subband components in the pipeline (see FIG. 11). The normal multiplication by step-size, which is dictated by the bit allocation, is avoided by predefining the bit allocation table to be the same for all audio components. The maximum scale factors indexes are looked up and divided into (or multiplied by inverse) the mixed result. The division and multiplication by the inverse operations are mathematically equivalent but the multiplication operation is an order of magnitude faster. Overflow can occur when the mixed result exceeds the value stored in one DWORD. Attempting to store a floating-point word as an integer creates an exception which is trapped and used to correct the scale factor applied to the affected subband. After the mixing process, data is stored in left shifted form.

Assembly and Queuing of Output Data Frames

Figure 4:
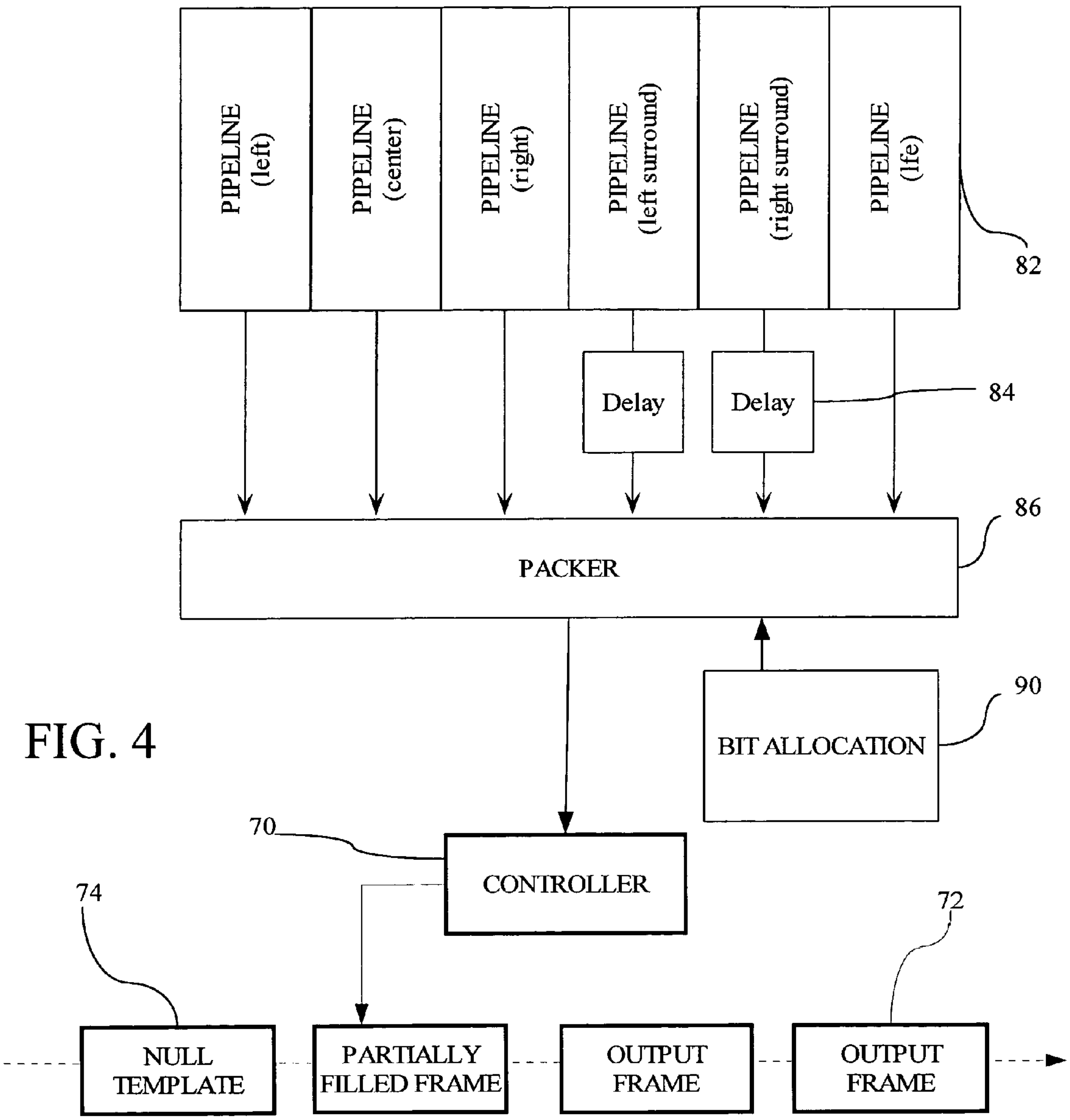
FIG. 4 is a block diagram of the packing process for assembling and queuing up the output data frames for transmission to a surround sound decoder.

As shown in FIG. 4, a controller 70 assembles output frames 72 and places them in a queue for transmission to a surround sound decoder. A decoder will only produce useful output if it can align to the repeating synchronization markers or sync codes embedded within the data stream. The transmission of coded digital audio via a S/PDIF data stream is an amendment of the original IEC958 specification and does not make provision for the identity of the coded audio format. The multiformat decoder must first determine the data format by reliably detecting concurrent sync words and then establish an appropriate decoding method. A loss of sync condition leads to an intermission in the audio reproduction as the decoder mutes its output signal and seeks to re-establish the coded audio format.

Controller 70 prepares a null output template 74 that includes compressed audio representing "silence". In the currently preferred embodiment, there are no differences in the header information from frame to frame and only the scale factors and subband data regions need to be updated. The template header carries unchanging information regarding the format of the stream bit allocation and the side information for decoding and unpacking information.

Concurrently, the audio renderer is generating the list of sound objects, mapping them to the speaker locations. Within the mapped data, the audible subband data is mixed by the pipeline 82 as described above. The multi-channel subband data generated by the pipelines 82, is compressed (step 78) into FLCs in accordance with the predefined bit allocation table. The pipelines are organized in parallel, each specific to a particular speaker channel.

ITU recommendation BS.775-1 recognizes the limitations of two-channel sound systems for multichannel sound transmissions, HDTV, DVD and other digital audio applications. It recommends three front loudspeakers combined with two rear/side loudspeakers arranged in a constant distance constellation around the listener. For certain cases where a modified ITU speaker arrangement is adopted then the left surround and right surround channels are delayed 84 by a whole number of compressed audio frames.

A packer 86 packs the scale factor and subband data (step 88) and submits the packed data to controller 70. The possibility of frame overflow is eliminated as the bit allocation tables for each channel in the output stream are predefined. The DTS Interactive format is not bit-rate limited and the simpler and more rapid encoding techniques of linear and block encoding can be applied.

To maintain decoder sync, controller 70 determines whether the next frame of packed data is ready for output (step 92). If the answer is yes, controller 70 writes the packed data (scale factors and subband data) over the previous output frame 72 (step 94) and puts it in the queue (step 96). If the answer is no, controller 70 outputs null output template 74. Sending compressed silence in this manner guarantees the interruption free output of frames to the decoder to maintain sync.

In other words, controller 70 provides a data pump process whose function is to manage the coded audio frame buffers for seamless generation by the output device and without introducing intermissions or gaps in the output stream. The data pump process queues the audio buffer that has most recently completed output. When a buffer finishes output it is reposted back to the output buffer queue and flagged as empty. This empty state flag permits a mixing process to identify and copy data into that unused buffer simultaneously as the next buffer in the queue is output and while the remaining buffers wait for output. To prime the data pump process the queue list must first be populated with null audio buffer events. The content of the initialization buffers whether coded or not should represent silence or other inaudible or intended signal. The number of buffers in the queue and size of each buffer influences the response time to user input. To keep latency low and provide a more realistic interactive experience the output queue is restricted to two buffers in depth while the size of each buffer is determined by the maximum frame size permitted by the destination decoder and by acceptable user latency.

Audio quality may be traded off against user latency. Small frame sizes are burdened by the repeat transmission of header information, which reduces the number of bits available to code audio data thereby degrading the rendered audio while large frame sizes are limited by the availability of local DSP memory in the home theater decoder thereby increasing user latency. Combined with the sample rate the two quantities determine the maximum refresh interval for updating the compressed audio output buffers. In the DTS interactive system this is the time-base that is used to refresh the localization of sounds and provide the illusion of real-time interactivity. In this system the output frame size is set to 4096 bytes offering a minimum header size, good time resolution for editing and loop creation and low latency to user responses. Typically 69 ms to 92 ms for a frame size of 4096 bytes and from 34 ms to 46 ms for a frame size of 2048 bytes. At each frame time the distance and angle of an active sound relative to the listener's position is calculated and this information used to render individual sounds. As an example refresh rates of between 31 Hz to 47 Hz depending on sample rate are possible for a frame size of 4096 bytes.

Looping Compressed Audio

Looping is a standard gaming technique in which the same sound bits are looped indefinitely to create a desired audio effect. For example, a small number of frames of a helicopter sound can be stored and looped to produce a helicopter for as long as the game requires. In the time domain, no audible clicking or distortion will be heard during the transition zone between the ending and the starting positions of the sound if the amplitude of the beginning and ends are complementary. This same technique does not work in the compressed audio domain.

Compressed audio is contained in packets of data encoded from fixed frames of PCM samples and further complicated by the inter-dependence of compressed audio frames on previously processed audio. The reconstruction filters in the DTS surround sound decoder delays the output audio such that the first audio samples will exhibit a low level transient behavior due to the properties of the reconstruction filter.

Figure 5:
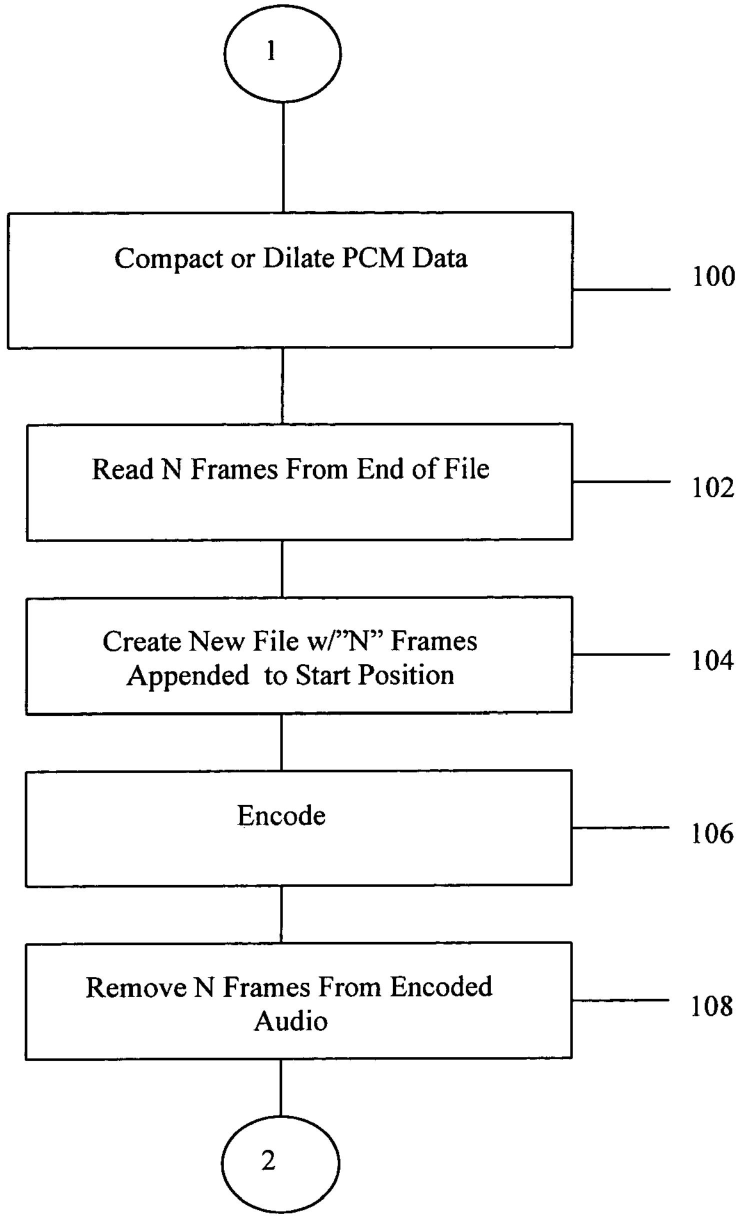
FIG. 5 is a flow chart illustrating the looping of compressed audio.

As shown in FIG. 5, the looping solution implemented in the DTS Interactive system is done off-line to prepare component audio for storage in a compressed format that is compatible with the real-time looping execution in the interactive gaming environment. The first step of the looping solution requires the PCM data of a looped sequence to be first compacted or dilated in time to fit precisely within the boundaries defined by a whole number of compressed audio frames (step 100). Encoded data is representative of a fixed number of audio samples from each encoded frame. In the DTS system the sample duration is a multiple of 1024 samples. To begin, at least N frames of uncompressed 'lead-out' audio are read out from the end of the file (step 102) and temporally appended to the start of the looped segment (step 104). In this example N has value 1 but any value sufficiently large to cover the reconstruction filters dependency on previous frames may be used. After encoding (step 106), N compressed frames are deleted from the beginning of the encoded bit-stream to yield a compressed audio loop sequence (step 108). This process ensures that the values resident in the reconstruction synthesis filter during the closing frames is in agreement with the values necessary to ensure seamless concatenation with the commencing frame and in doing so prevent audible clicking or distortion. On looped playback the read pointers are directed back to the start of the looped sequence for glitch free playback.

DTS Interactive Frame Format

Figure 6:
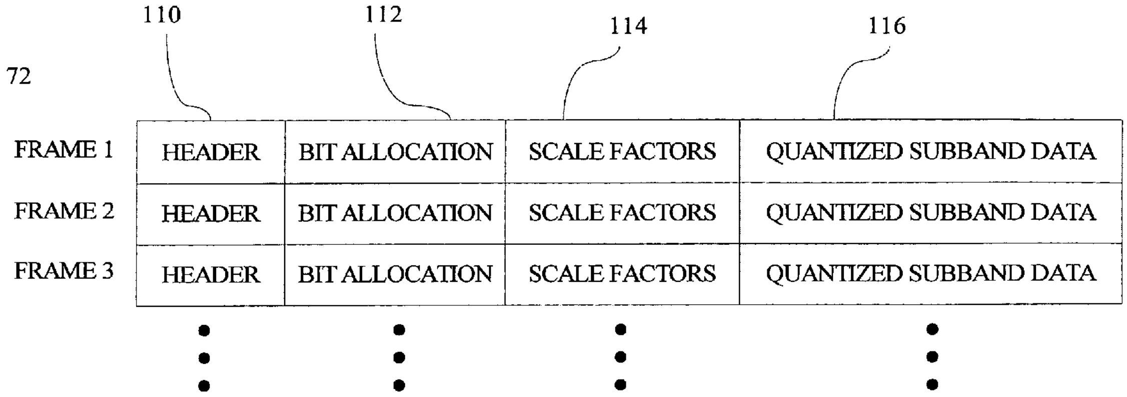
FIG. 6 is a diagram depicting the organization of the data frames.

A DTS Interactive frame 72 consists of data arranged as shown in FIG. 6. The header 110 describes the format of the content, the number of subbands, the channel format, sampling frequency and tables (defined in the DTS standard) required to decode the audio payload. This region also contains a sync word to identify the start of the header and provide alignment of the encoded stream for unpacking.

Following the header, bit allocation section 112 identifies which subbands are present in a frame, together with an indication of how many bits are allocated per subband sample. A zero entry in the bit allocation table indicates that the related subband is not present in the frame. The bit allocation is fixed from component to component, channel-to-channel, frame-to-frame and for each subband for mixing speed. A fixed bit allocation is adopted by the DTS Interactive systems and removes the need to examine, store and manipulate bit allocation tables and eliminates the constant checking of bit width during the unpacking phase. For example the following bit allocation is suitable for use {15,10,9,8,8,8,7,7,7,6,6,5,5,5,5,5,5,5,5,5,5,5,5,5,5,5,5,5,5,5,5,5}.

The scale factor section 114 identifies the scale factor for each of the subbands, e.g. 32-subbands. The scale factor data varies from frame-to-frame with the corresponding subband data.

Lastly, the subband data section 116 includes all of the quantized subband data. As shown in FIG. 7, each frame of subband data consists of 32 samples per subband organized as four vectors 118*a*–118*d* of size eight. Subband samples can be represented by linear codes or by block codes. Linear codes begin with a sign bit followed by the sample data while block codes are efficiently coded groups of subband samples inclusive of sign. The alignment of the bit allocation 112 and scale factors 114 with subband data 116 is also depicted.

Subband-Domain Mixing of Compress Audio

As described previously, DTS Interactive mixes the component audio in a compressed format, e.g. subband data, rather than the typical PCM format and thus realizes tremendous computational, flexibility and fidelity benefits. These benefits are obtained by discarding those subbands that are inaudible to the user in two stages. First, the gaming programmer can, based on a priori information about the frequency content of a specific audio component, discard the upper (high frequency) subbands that contain little or no useful information. This is done off-line by setting the upper band bit allocations to zero before the component audio is stored.

More specifically, sample rates of 48.0 kHz, 44.1 kHz and 32.0 kHz are frequently encountered in the audio but the higher sample rates offer high fidelity full bandwidth audio at the cost of memory. This can be wasteful of resources if the material contains little high frequency content such as voice. Lower sample rates may be more appropriate for some material but the problems of mixing differing sample rates arise. Game audio frequently uses the 22.050 kHz sampling rate as a good compromise between both audio quality and memory requirements. In the DTS Interactive system all material is encoded at the highest supported sample rate mentioned earlier and material that does not fully occupy the full audio spectrum is treated as follows. Material intended for encoding at say 11.025 kHz is sampled at 44.1 kHz and the upper 75% of subbands describing the high frequency content are discarded. The result is an encoded file that retains compatibility and ease of mixing with other higher fidelity signals and yet allows a reduced file size. It is easy to see how this principle can be extended to enable 22.050 kHz sampling by discarding the upper 50% of subbands.

Second, DTS Interactive unpacks the scale factors (step 120) and uses them in a simplified psychoacoustic analysis (see FIG. 9) to determine which of the audio components selected by the map function (step 54) are audible in each subband (step 124). A standard psychoacoustic analysis that takes into account neighboring subbands could be implemented to achieve marginally better performance but would sacrifice speed. Thereafter, the audio renderer unpacks and decompresses only those subbands that are audible (step 126). The renderer mixes the subband data for each subband in the subband domain (step 128), recompresses it and formats it for packing as shown in FIG. 4 (item 86).

The computational benefits of this process are realized from having to unpack, decompress, mix, recompress and pack only those subbands that are audible. Similarly, because the mixing process automatically discards all of the inaudible data, the gaming programmer is provided greater flexibility to create richer sound environments with a larger number of audio components without raising the quantization noise floor. These are very significant advantages in a real-time interactive environment where user latency is critical and rich high fidelity immersive audio environment is the goal.

Psychoacoustic Masking Effects

Psychoacoustic measurements are used to determine perceptually irrelevant information, which is defined as those parts of the audio signal which cannot be heard by human listeners, and can be measured in the time domain, the subband domain, or in some other basis. Two main factors influence the psychoacoustic measurement. One is the frequency dependent absolute threshold of hearing applicable to humans. The other is the masking effect that one sound has on the ability of humans to hear a second sound played simultaneously or even after the first sound. In other words the first sound, in the same or neighboring subband, prevents us from hearing the second sound, and is said to mask it out.

In a subband coder the final outcome of a psychoacoustic calculation is a set of numbers which specify the inaudible level of noise for each subband at that instant. This computation is well known and is incorporated in the MPEG 1 compression standard ISO/IEC DIS 11172 "Information technology-Coding of moving pictures and associated audio for digital storage media up to about 1.5 Mbits/s," 1992. These numbers vary dynamically with the audio signal. The coder attempts to adjust the quantization noise floor in the subbands by way of the bit allocation process so that the quantization noise in these subbands is less than the audible level.

DTS Interactive currently simplifies the normal psychoacoustic masking operation by disabling the inter-subband dependence. In the final analysis, the calculation of the intra-subband masking effects from the scale factors will identify the audible components in each subband, which may or may not be the same from subband to subband. A full psychoacoustic analysis may provide more components in certain subbands and completely discard other subbands, most likely the upper subbands.

As shown in FIG. 9, the psychoacoustic masking function examines the object list and extracts the maximum modified scale value for each subband of the supplied component streams (step 130). This information is input to the masking function as a reference for the loudest signal that is present in the object list. The maximum scale factors are also directed to the quantizer as the basis for encoding the mixed results into the DTS compressed audio format.

For DTS-domain filtering, the time-domain signal is not available, so masking thresholds are estimated from the subband samples in the DTS signal. A masking threshold is calculated for each subband (step 132) from the maximum scale factor and the human auditory response. The scale factor for each subband is compared to the masking threshold for that band (step 136) and if found to be below the masking threshold set for that band then the subband is considered to be inaudible and removed from the mixing process (step 138) otherwise the subband is deemed to be audible and is kept for the mixing process (step 140). The current process only considers masking effects in the same subband and ignores the effects of neighboring subbands. Although this reduces performance somewhat, the process is simpler and hence much faster as required in an interactive real-time environment.

Bit Manipulation

As discussed above, DTS Interactive is designed to reduce the number of computations required to mix and render the audio signal. Significant effort is expended to minimize the quantity of data that must be unpacked and repacked because these and the decompress/recompress operations are computationally intensive. Still the audible subband data must be unpacked, decompressed, mixed, compressed and repacked. Therefore, DTS Interactive also provides a different approach for manipulating the data to reduce the number of computations to unpack and pack the data as shown in FIGS. 10*a*–10*c* and to mix the subband data as shown in FIG. 11.

Digital Surround systems typically encode the bit stream using variable length bit fields to optimize compression. An important element of the unpacking process is the signed extraction of the variable length bit fields. The unpacking procedure is intensive due to the frequency of executing this routine. For example to extract an N-bit field, 32-bit (DWORD) data is first shifted to the left to locate the sign bit in the left most bit field. Next, the value is divided by powers of two or right shifted by (32-N) bit positions to introduce the sign extension. The large number of shifting operations take a finite time to execute and unfortunately cannot be executed in parallel or pipelined with other instructions on the present generation of Pentium processors.

DTS Interactive by takes advantage of the fact that the scale factor is related to the bit width size and realizes that this provides the possibility to ignore the final right shifting operation if a) in its place the scale factors are treated accordingly and b) the number of bits that represent the subband data are sufficient that the "noise" represented by the (32-N) right most bits is below the noise floor of the reconstructed signal. Although N may be only a few bits this typically only occurs in the upper subbands where the noise floor is higher. In VLC systems that apply very high compression ratios the noise floor could be exceeded.

As shown in FIG. 10*a*, a typical frame will include a section of subband data 140, which includes each piece of N-bit subband data 142 where N is allowed to vary across the subbands but not the samples. As shown in FIG. 10*b*, the audio renderer extracts the section of subband data and stores it in local memory, typically as 32-bit words 144 where the first bit is the sign bit 146 and the next thirty-one bits are data bits.

As shown in FIG. 10*c*, the audio renderer has shifted subband data 142 to the left so that its sign bit is aligned with sign bit 146. Since all of the data is stored as FLCs rather than VLCs this is a trivial operation. The audio renderer does NOT right shift the data. Instead, the scale factors are prescaled by dividing them by 2 raised to the power of (32-N) and stored and the 32-N rightmost bits 148 are treated as inaudible noise. In other words, a one bit left shift of the subband data combined with a one bit right shift of the scale factor does not alter the value of the product. The same technique can also be utilized by the decoder.

After summation of all mixing products and quantization it is a simple matter to identify those values that will overflow since the storage limit is fixed. This offers greatly superior detection speed in comparison to a system where the subband data has not be treated by the left shift operation.

When the data is repacked, the audio rendered simply grabs the leftmost N-bits from each 32-bit word thereby avoiding 32-N left shift operations. The avoidance of (32-N) right and left shift operations may seem to be rather insignificant but the frequency of executing the unpack and pack routines is so high that it represents a significant reduction in computations.

Mixing Subband Data

As shown in FIG. 11, the mixing process commences and the audible subband data is multiplied by the corresponding scale factor, which has been adjusted for position, equalization, phase localization etc, (step 150) and the sum is added to the corresponding subband products of the other eligible items in the pipeline (step 152). Since the number of bits for each component in a given subband is the same the step size factors can be ignored thus saving computations. The maximum scale factors indexes are looked up (step 154) and the inverse is multiplied by the mixed result (step 156).

Overflow can occur when the mixed result exceeds the value stored in one DWORD (step 158). Attempting to store a floating point word as an integer creates an exception which is trapped and used to correct the scale factor applied to all affected subbands. If the exception occurs, the maximum scale factor is incremented (step 160) and the subband data is recalculated (step 156). The maximum scale factors are used as a starting point because it is better to err on the conservative side and increment the scale factor rather than reduce the dynamic range of the signal. After the mixing process, data is stored in left shifted form by modification of the scale factor data for recompression and packing.

While several illustrative embodiments of the invention have been shown and described, numerous variations and alternate embodiments will occur to those skilled in the art. For example, two 5.1 channel signals could be mixed and interleaved together to produce a 10.2 channel signal for true 3D immersion with the added dimension of height. In an addition processing combination, instead of processing one frame at a time, the audio renderer could reduce the frame size by one-half and process two frames at a time. This would reduce latency by one-half but at the cost of wasting some bits on repeating the header information twice as often. However, in a dedicated system much of the header information could be eliminated. Such variations and alternate embodiments are contemplated, and can be made without departing from the spirit and scope of the invention as defined in the appended claims.

What is claimed is:

1. A multi-channel interactive audio system, comprising:

A memory for storing a plurality of audio components having positional coordinates as sequences of input data frames, each said input data frame including subband data and their scale factors that have been compressed and packed;

A human input device (HID) for receiving a positional input from a user;

An application programming interface (API) that generates a list of audio components in response to the positional input; and An audio renderer that For each audio component on the list, unpacks and decompresses the audio components' scale factors and, as needed, the subband data;

Calculates scale factors for the subband data in accordance with the positional input relative to the positional coordinates;

Mixes the audio components' subband data in the subband domain for each channel using the calculated scale factors for each channel;

Compresses the mixed subband data and their scale factors for each channel;

Packs and multiplexes the channels' compressed subband data and scale factors into an output frame; and Places the output frame into a queue for transmission to a decoder.

2. The multi-channel interactive audio system of claim 1, wherein the audio renderer mixes only the subband data that is considered audible to the user.

3. The multi-channel interactive audio system of claim 2, wherein the audio renderer determines which subbands are audible to the user by using the listed audio components' calculated scale factors to calculate the intra-subband masking effects and discard the inaudible audio components for each subband.

4. The multi-channel interactive audio system of claim 3, wherein the audio renderer unpacks and decompresses the audio components' scale factors first, calculates the scale factors, determines the audible subbands, and then unpacks and decompresses only the subband data in the audible subbands.

5. The multi-channel interactive audio system of claim 4, wherein the audio renderer a. stores the unpacked and decompressed subband data in a left shifted format in the memory in which the sign bit of the N-bit subband data is aligned to the sign bit of the M-bit format and the M-N rightmost bits represent noise that is below a noise floor;

b. for each subband, multiplies the audible subband data by their respective scale factor and adds them together into a sum;

c. for each subband, multiplies the sum by the reciprocal of the maximum scale factor for the audible subband data to produce the mixed subband data;

d. if the mixed subband data overflows the format, increments the maximum scale factor to the next largest value and repeats step c.

6. The multi-channel interactive audio system of claim 1, wherein the input data frame further includes a header and a bit allocation table that are fixed from frame-to-frame so that only the content of the scale factors and subband data are allowed to vary but are otherwise of fixed size in the compressed stream.

7. The multi-channel interactive audio system of claim 6, wherein the compressed subband data is coded with fixed length codes.

8. The multi-channel interactive audio system of claim 7, wherein the audio renderer unpacks each piece of the N-bit subband data, where N varies across the subbands, as follows:

a. Utilizes the FLCs and fixed bit allocation to calculate the position of the subband data in the input audio frame, extract the subband data and stores it in the memory as M-bit words where the leftmost bit is a sign bit; and b. Left shifts the subband data until its sign bit is aligned with the M-bit word's sign bit, the rightmost M-N bits remaining in said M-bit word as noise.

9. The multi-channel interactive audio system of claim 8, wherein the audio renderer is hardcoded for the fixed header and bit allocation table so that the audio renderer only processes the scale factors and subband data to increase speed.

10. The multi-channel interactive audio system of claim 1, wherein the audio render interfaces with an application that provides equalization of the audio components, said audio renderer equalizing each said audio component by modifying its scale factors.

11. The multi-channel interactive audio system of claim 1, wherein the audio render interfaces with an application that provides for sideways localization of the audio components, said audio renderer sideways localizing the audio components by applying a phase positioning filter to the subband data.

12. The multi-channel interactive audio system of claim 1, wherein the input and output frames also include a header and a bit allocation table, the audio renderer providing for the seamless generation of output frames to maintain decoder sync by, a. placing a null output template in the queue that includes the header, the bit allocation table and subband data and scale factors that represent an inaudible signal;

b. if the next frame of mixed subband data and scale factors is ready, writing the mixed subband data and scale factors over the previous output frame and transmitting the output frame; and c. if the next frame is not ready, transmitting the null output template.

13. The multi-channel interactive audio system of claim 1, wherein said decoder is a Digital Surround Sound decoder that is capable of decoding prerecorded multi-channel audio, said audio renderer transmitting a sequence of said output frames that provide real-time interactive multi-channel audio with the same format as the prerecorded multi-channel audio.

14. The multi-channel interactive audio system of claim 13, further comprising a single bandlimited connector, said audio renderer transmitting, in real-time and in response to the user input, the output frames as a unified and compressed bitstream over the single bandlimited connector to the Digital Surround Sound decoder, which decodes the bitstream into the interactive multi-channel audio whose bandwidth exceeds that of the single bandlimited connector.

15. The multi-channel interactive audio system of claim 1, further comprising a single bandlimited connector, said audio renderer transmitting, in real-time and in response to the user input, the output frames as a unified and compressed bitstream over the single bandlimited connector to the decoder, which decodes the bitstream into multi-channel audio whose bandwidth exceeds that of the single bandlimited connector.

16. The multi-channel interactive audio system of claim 1, wherein one or more of the audio components comprise looped data having commencing input frames and closing input frames whose subband data has been preprocessed to ensure seamless concatenation with the commencing frame.

17. A multi-channel interactive audio system, comprising:

A memory for storing a plurality of audio components as sequences of input data frames in a bitstream that is coded with fixed length codes (FLCs), each said input data frame including a header, a bit allocation table, subband data and their scale factors that have been compressed and packed, said header and bit allocation table being fixed from component-to-component, channel-to-channel and frame-to-frame so that only the content of the scale factors and subband data are allowed to vary;

A human input device (HID) for receiving input from a user;

An application programming interface (API) that generates a list of audio components in response to the user input; and An audio renderer, which is hardcoded for the fixed header and bit allocation table, that For each audio component on said list, unpacks and decompresses the audio components' scale factors Calculates scale factors for the mixed subband data in accordance with the user input;

Uses the scale factors to determine the audible subband data;

Unpacks and decompresses only the audible subband data

Mixes the audible subband data in the subband domain for each channel using the calculated scale factors;

Compresses the mixed subband data and their scale factors for each channel;

Packs and multiplexes the channels' compressed subband data and scale factors into an output frame; and Places the output frame into a queue for transmission to a decoder.

18. The multi-channel interactive audio system of claim 17, wherein the audio renderer unpacks each piece of the N-bit audible subband data, where N varies across the subbands, as follows:

a. Utilizes the FLCs and fixed bit allocation to calculate the position of the audible subband data in the input audio frame, extract the audible subband data and stores it in the memory as M-bit words where the leftmost bit is a sign bit; and b. Left shifts the audible subband data until its sign bit is aligned with the M-bit word's sign bit, the rightmost M-N bits remaining in said M-bit word as noise.

19. The multi-channel interactive audio system of claim 17, wherein the decoder is a Digital Surround Sound decoder that is capable of decoding pre-recorded multi-channel audio.

20. The multi-channel interactive audio system of claim 17, wherein the audio renderer generates a seamless sequence of output frames by a. placing a null output template in a queue for transmission to a decoder that includes the header, the bit allocation table and subband data and scale factors that represent an inaudible signal;

b. if the next frame of mixed subband data and scale factors is ready, writing the mixed subband data and scale factors over the previous output frame and transmitting the output frame; and c. if the next frame is not ready, transmitting the null output template.

21. A multi-channel interactive audio system, comprising:

A memory for storing a plurality of audio components as sequences of input data frames, each said input data frame including a header, a bit allocation table, and audio data that has been compressed and packed;

A human input device (HID) for receiving input from a user;

An application programming interface (API) that generates a list of audio components in response to the user input; and An audio renderer that generates a seamless sequence of output frames by a. placing a null output template in a queue for transmission to a decoder that includes the header, the bit allocation table and subband data and scale factors that represent an inaudible signal;

b. concurrently unpacking and decompressing the audio components' data as needed, and for each channel, calculating scale factors for the mixed data in accordance with the user input, mixing the audio components' data for each channel, compressing the mixed data for each channel, and packing and multiplexing the channels' compressed data;

c. if the next frame of mixed data is ready, writing the mixed data over the previous output frame and transmitting the output frame; and d. if the next frame is not ready, transmitting the null output template.

22. The multi-channel interactive audio system of claim 21, wherein the decoder is a Digital Surround Sound decoder that is capable of decoding pre-recorded multi-channel audio.

23. The multi-channel interactive audio system of claim 21, wherein the audio data comprises subband data and its scale factors, the audio renderer mixing only the subband data that is considered audible to the user.

24. The multi-channel interactive audio system of claim 23, wherein the audio renderer determines which subbands are audible to the user by using the listed audio components' scale factors to calculate the intra-subband masking effects and discard the inaudible audio components for each subband.

25. The multi-channel interactive audio system of claim 24, wherein the audio renderer unpacks and decompresses the audio components' scale factors first, determines the audible subbands, and then unpacks and decompresses only the subband data in the audible subbands.

26. A multi-channel interactive audio system, comprising:

A human input device (HID) for receiving a positional input from a user;

A console, comprising:

A memory for storing a plurality of audio components having positional coordinates_as sequences of input data frames, each said input data frame including subband data and their scale factors that have been compressed and packed;

An application programming interface (API) that generates a list of audio components in response to the positional input; and An audio renderer that For each audio component on the list, Unpacks and decompresses the audio components' scale factors and, as needed, the subband data;

Calculates scale factors for the mixed subband data in accordance with the positional input relative to the positional coordinates;

Mixes the audio components' subband data in the subband domain for each channel in accordance with the calculated scale factors;

Compresses the mixed subband data and their scale factors for each channel;

Packs and multiplexes the channels' compressed subband data and scale factors into an output frame; and Places the output frame into a queue where the compressed audio data is output as a seamless unified bitstream;

A digital decoder that decodes the bitstream into a multichannel audio signal; and A single bandlimited connector that delivers the bitstream to the decoder.

27. A method of rendering multi-channel audio, comprising:

a. Storing a plurality of audio components having positional coordinates as sequence of input data frames, each said input data frame including subband data and their scale factors that have been compressed and packed;

b. In response to a user positional input for a user, generating a list of audio components;

c. For each audio component on the list, Unpacking and decompressing the input data frames to extract the scale factors;

d. Modifying the scale factors in accordance with the positional input relative to the positional coordinates;

e. Further unpacking and decompressing the input data frames to extract the subband data;

f. Mixing the subband data for each channel in accordance with the calculated scale factors;

g. Compressing the mixed subband data and their scale factors;

h. Packing and multiplexing the channels' compressed subband data and scale factors into an output frame; and i. Placing the output frame into a queue for transmission to a decoder.

28. The method of claim 27, wherein unpacking and decompressing the input data frames comprises:

unpacking and decompressing only the scale factors;

using the modified scale factors to determine which subbands are audible;

unpacking and decompressing only the audible subband data.

29. The method of claim 28, further comprising sideways localizing the audio components by applying a phase positioning filter to the subband data for the first and second subbands that span the range from approximately 200 Hz to approximately 1200 Hz.

30. The method of claim 27, further comprising:

a. placing a null output template in a queue for transmission to a decoder that includes the header, the bit allocation table and subband data and scale factors that represent an inaudible signal;

b. if the next frame of mixed subband data and scale factors is ready, writing the mixed subband data and scale factors over the previous output frame and transmitting the output frame; and c. if the next frame is not ready, transmitting the null output template.

31. The multi-channel interactive audio system of claim 1, wherein said API generates the list in response to an action input received by the HID and tracks the positional coordinates of the audio components on the list.

32. The multi-channel interactive audio system of claim 16, wherein the audio components are stored as PCM audio data in a file, said subband data being preprocessed by:

a. Compacting or dilating the PCM audio data in time to fit the boundaries defined by a whole number of compressed audio frames to form a looped segment;

b. Appending N frames of PCM audio data from the end of the file to the start of the looped segment;

c. Encoding the looped segment into a bitstream, and d. Deleting N compressed frames from the beginning of the encoded bitstream to yield a compressed audio loop sequence in which the compressed audio data in the closing input frames of the loop sequence ensure seamless concatenation with the commencing input frames during looping.

33. A multi-channel interactive audio system, comprising:

A memory for storing a plurality of audio components having positional coordinates in a 3D sound field as sequences of input data frames, each said input data frame including subband data and their scale factors that have been compressed and packed;

A human input device (HID) for receiving input for a user including a positional input and an action input;

An application programming interface (API) that in response to the action input generates a list comprising a subset of said audio components and tracks their positional coordinates in the 3D sound field; and An audio renderer that, For each audio component on the list, unpacks and decompresses the input data frames to extract the scale factors;

Modifies the scale factors in response to the user positional input relative to the audio component's tracked positional coordinates;

Modifies the scale factors according to assigned mapping coefficients for each channel in the 3D sound field;

Further Unpacks and decompresses the input data frames to extract the subband data;

Mixes the subband data in the subband domain in accordance with the modified scale factors for each channel;

Compresses the mixed subband data and their scale factors for each channel;

Packs and multiplexes the channels' compressed subband data and scale factors into an output frame; and Places the output frame into a queue for transmission to a decoder.

34. The multi-channel interactive audio system of claim 33, wherein the audio renderer uses the modified scale factors to determine the inaudible audio components for each subband and then further unpacks and decompresses the input data frames to extract only the subband date in the audible subbands.

35. The multi-channel interactive audio system of claim 33, wherein the input data frame further includes a header and a bit allocation table that are fixed from frame-to-frame so that only the content of the scale factors and subband data are allowed to vary but are otherwise of fixed size in the compressed stream.

36. The multi-channel interactive audio system of claim 33, wherein the input and output frames also include a header and a bit allocation table, the audio renderer providing for the seamless generation of output frames to maintain decoder sync by, a. placing a null output template in the queue that includes the header, the bit allocation table and subband data and scale factors that represent an inaudible signal;

b. if the next frame of mixed subband data and scale factors is ready, writing the mixed subband data and scale factors over the previous output frame and transmitting the output frame; and d. if the next frame is not ready, transmitting the null output template.

37. The multi-channel interactive audio system of claim 33, wherein one or more of the audio components comprise looped data having commencing input frames and closing input frames whose subband data has been preprocessed to ensure seamless concatenation with the commencing frame.

38. A multi-channel interactive audio system, comprising:

A memory for storing a plurality of audio components as sequences of input data frames, each said input data frame including subband data and their scale factors that have been compressed and packed; and An audio renderer that, Unpacks and decompresses the input data frames to extract the scale factors for audio components selected in response to a user input;

Modifies the scale factors in response to the user input;

Modifies the scale factors according to assigned mapping coefficients for each channel in a 3D environment;

Further unpacks and decompresses the input data frames to extract the subband data;

Mixes the subband data in the subband domain in accordance with the modified scale factors for each channel;

Compresses the mixed subband data and their modified scale factors for each channel;

Packs and multiplexes the channels' compressed subband data and modified scale factors into an output frame; and Places the output frame into a queue for transmission to a decoder;

wherein the input and output frames also include a header and a bit allocation table, the audio renderer providing for the seamless generation of output frames to maintain decoder sync by, a. placing a null output template in the queue that includes the header, the bit allocation table and subband data and scale factors that represent an inaudible signal;

b. if the next frame of mixed subband data and scale factors is ready, writing the mixed subband data and scale factors over the previous output frame and transmitting the output frame; and e. if the next frame is not ready, transmitting the null output template.

* * * * *